June 20, 1944.     J. C. TRAVILLA, JR     2,352,039
RAILWAY VEHICLE STRUCTURE
Filed June 10, 1942     3 Sheets-Sheet 1

INVENTOR.
JAMES C. TRAVILLA, JR.
BY Rodney Bedell
ATTORNEY

June 20, 1944. J. C. TRAVILLA, JR 2,352,039
RAILWAY VEHICLE STRUCTURE
Filed June 10, 1942 3 Sheets-Sheet 2

INVENTOR.
JAMES C. TRAVILLA, JR.
BY
Rodney Bedell
ATTORNEY

June 20, 1944.　　　J. C. TRAVILLA, JR　　　2,352,039
RAILWAY VEHICLE STRUCTURE
Filed June 10, 1942　　　3 Sheets-Sheet 3

*INVENTOR.*
JAMES C. TRAVILLA, JR.
BY
*Rodney Bedell*
ATTORNEY

Patented June 20, 1944

2,352,039

UNITED STATES PATENT OFFICE 2,352,039

RAILWAY VEHICLE STRUCTURE

James C. Travilla, Jr., Swarthmore, Pa., assignor to General Steel Castings Corporation, Granite City, Ill., a corporation of Delaware Application June 10, 1942, Serial No. 446,469

9 Claims. (Cl. 105—199)

The invention relates to railway rolling stock and consists in a shock absorber connection between a railway vehicle body and a truck supporting the same.

The invention is suitable for all trucks having a spring-borne truck frame and is particularly adapted for trucks in which frame-supporting springs are mounted directly upon axle boxes spaced longitudinally of the truck and in which the compression and expansion of the springs near the opposite ends of the truck may be synchronized so that one end of the truck frame is raised while the other end is lowered, resulting in a tendency of the truck to "gallop" which seriously affects the riding qualities of the truck. The spring actions mentioned may result from track or wheel inequalities, the appliction and release of brakes, and other causes.

Truck frame "gallop" or vertical oscillation would be possible, however, in any truck which has the frame suspended between two spring systems; that is, one system to support the frame, such as journal box springs or equalizer springs, and the other system to apply the load to the frame, such as bolster springs.

The main object of the invention is to dampen or prevent oscillation of the truck frame about a transverse axis at or near the center of the truck.

Another object of the invention is to provide a dampening means between the truck frame and car body and at the same time to accommodate all necessary movements of the vehicle body and truck frame relative to each other. This is accomplished by providing one or more shock absorbers between the truck frame and the car body so arranged that ordinary vertical, lateral, and swivelling movements of the truck relative to the car body may occur without substantial resistance from the hydraulic fluid and friction elements of the shock absorber device, but arranged so that substantial resistance would be built up if abnormal vertical movements of the truck relative to the car body occurs, such movements being dampened to prevent "gallop."

These and other detailed objects of the invention are attained by the structure illustrated in the accompanying drawings in which—

Figures 5, 6:
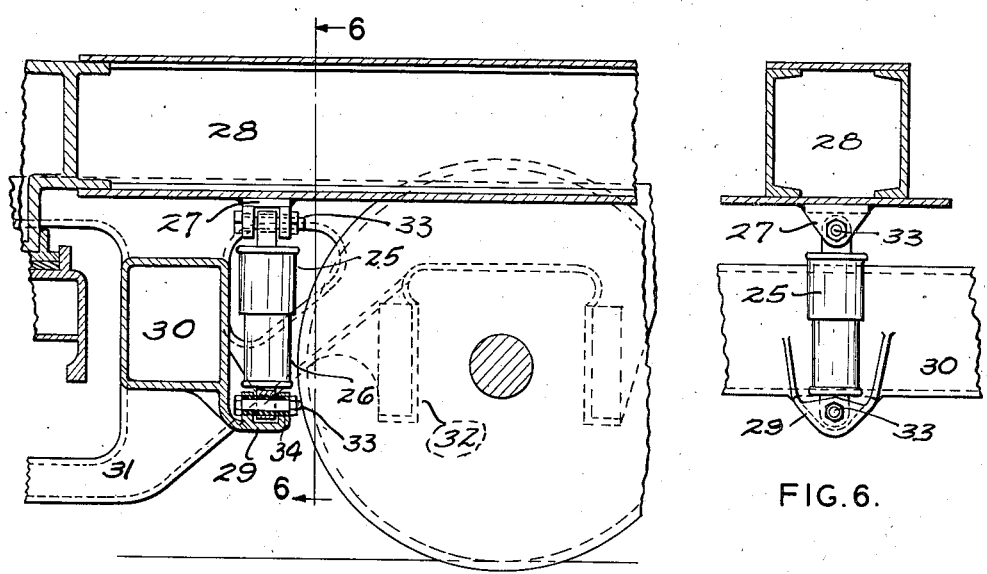
Figure 5 is a longitudinal vertical section through a portion of the vertical truck and body illustrating another form of the invention.
Figure 6 is a transverse vertical section taken on the line 6—6 of Figure 5.
Figures 7, 8:
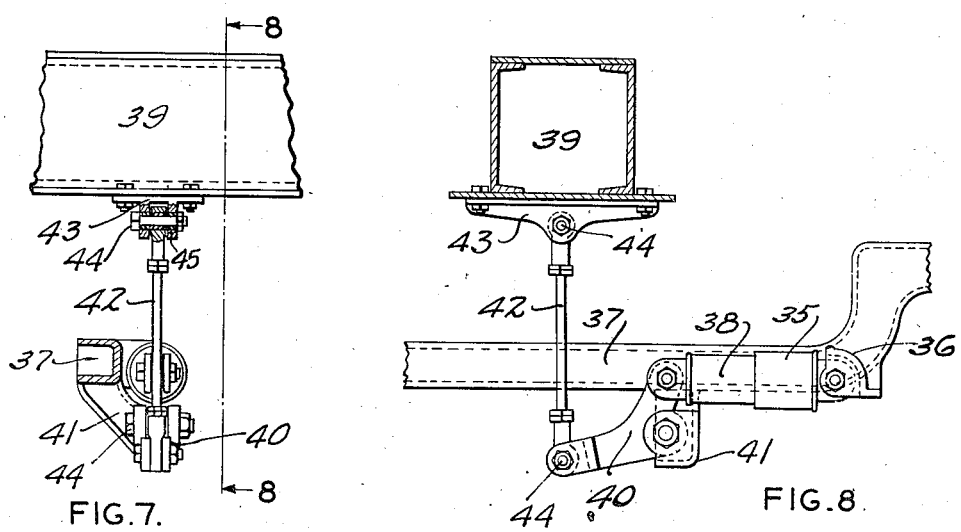

Figures 7 and 8 are detail views corresponding to Figures 5 and 6 but illustrating another form of the invention, Figure 8 being taken on the line 8—8 of Figure 7.

Figure 9:
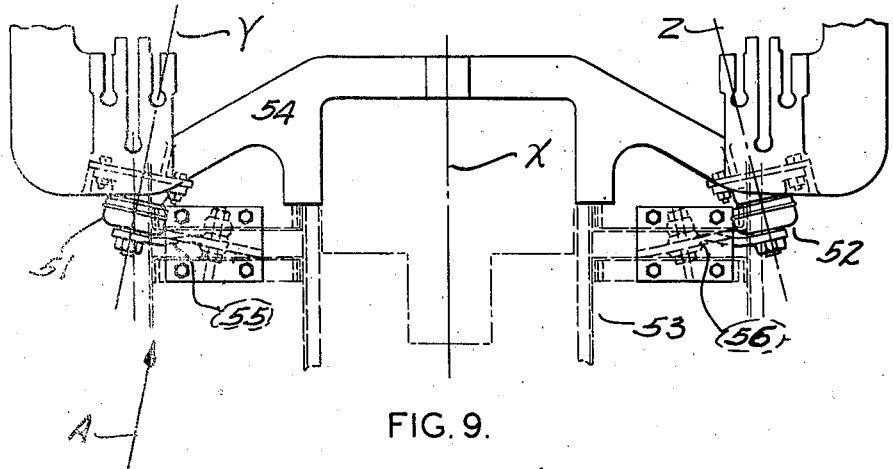

Figure 9 is a top view of one end of a truck with dampening devices arranged at opposite sides of the truck to prevent undesirable vertical movement of the truck and body.

Figure 10:
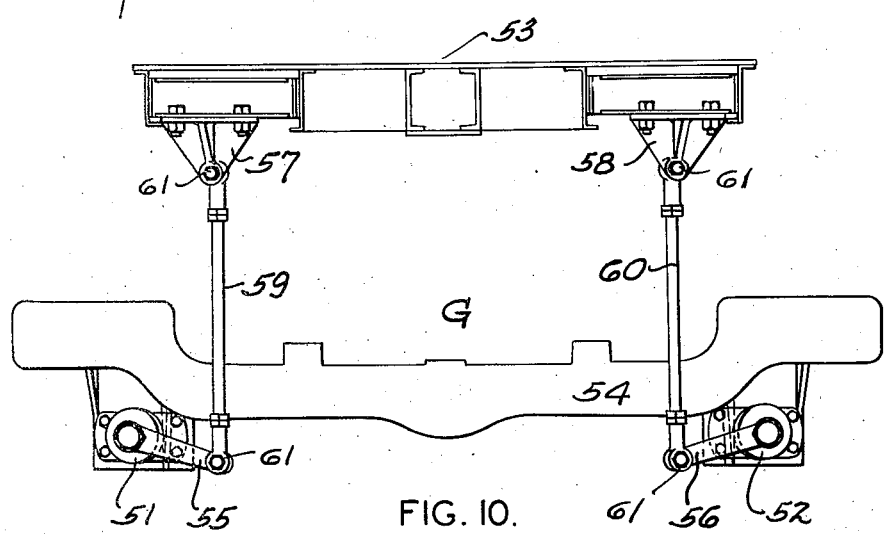

Figure 10 is an end view of the arrangement shown in Figure 9 with adjacent portions of the body structure also illustrated.

Figure 11:
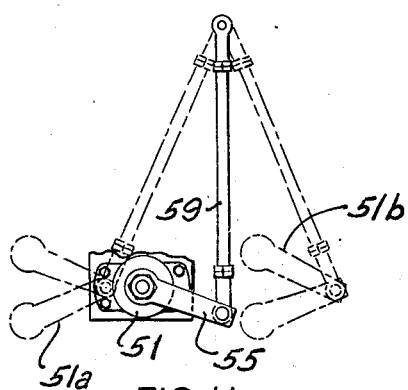

Figure 11 is a view in diagrammatic form of one of the shock absorbing devices and associated parts corresponding generally to Figure 10 but illustrating different relative positions of the parts under different operating conditions. The figure is taken in the direction of the arrow A in Figure 9.

Figure 1:
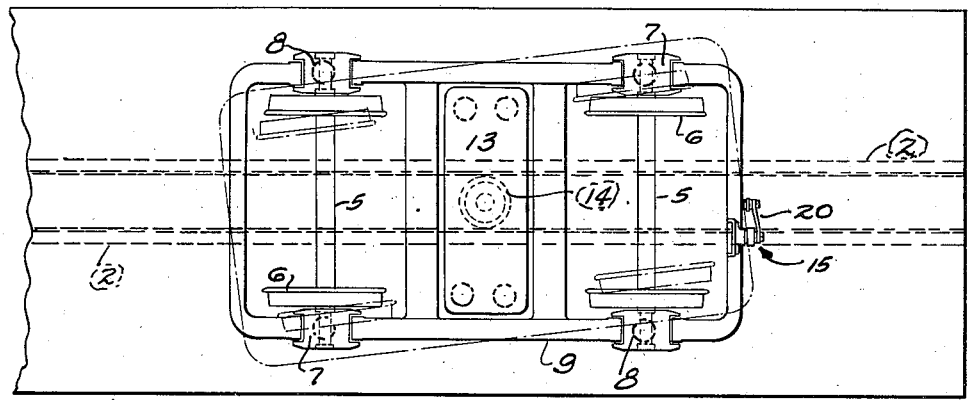
Figure 1 is a bottom view, largely diagrammatic, of a swivelling truck and a vehicle body mounted thereon.
Figure 2:
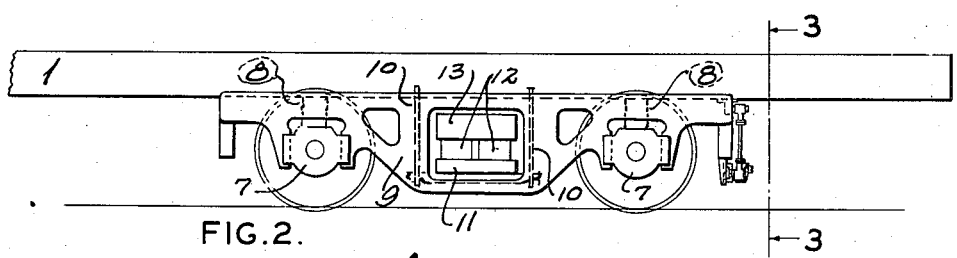
Figure 2 is a side elevation of the structure shown in Figure 1.
Figure 3:
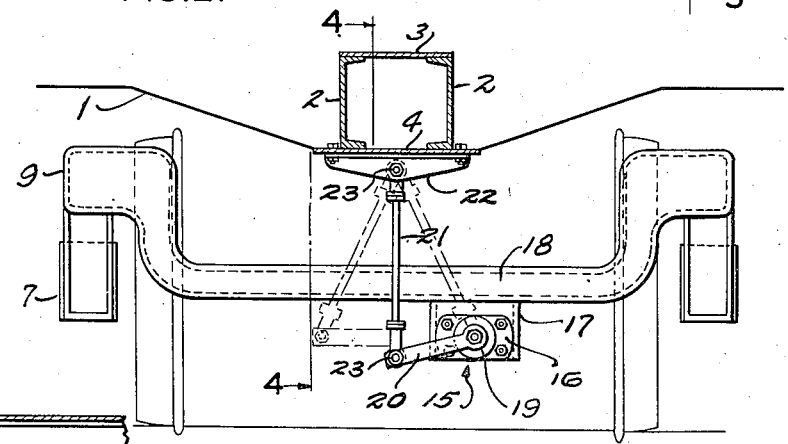
Figure 3 is a vertical transverse section taken on the line 3—3 of Figure 2 and drawn to a larger scale.

In Figures 1, 2 and 3, the vehicle body is indicated at 1 and includes a box section center sill comprising spaced channels 2 and top and bottom cover plates 3 and 4. The supporting truck includes spaced axles 5 mounting wheels 6 and journal boxes 7 which carry respective coil springs 8 received in and supporting the truck side frames 9. Preferably swing hangers 10 are pivotally suspended from frame 9 and support a spring plank 11 carrying springs 12 which mount the truck bolster 13 which includes a center plate 14 pivotally connected to the vehicle body center plate. All of the above described structure is well known in the art and in itself does not constitute the present invention.

The vehicle body may move as a unit laterally of the truck frame due to the action of the bolster swing hangers, and the truck and body may swivel relative to each other due to the construction of their center plates. Obviously these actions may be cumulative and particularly at the ends of the truck. Also the truck frame and the vehicle body may move vertically relative to each other due to the action of the bolster springs and due to track irregularities. There will be additional vertical movement of the truck frame relative to the wheels, axles, and journal boxes because of the action of the frame supporting springs 8. All of these movements are desirable and contribute to the essential functioning of the parts and to the easy riding qualities of the vehicle.

There may be additional relative vertical longitudinal tilting movement of the truck frame and the vehicle body due to difference in the actions of springs 8 at opposite ends of the truck. Such different actions may be started by inequalities in the rail, by other conditions in the truck, or by operating conditions, and if successive forces are synchronized, the difference in spring action will develop to such an extent that there will be oscillation of the truck frame relative to the car body resulting in an undesirable "galloping" action of the truck frame and a longitudinal oscillation of the car body.

The present invention contemplates the prevention of this action by checking the relative tilting of the truck frame and body and this is accomplished by use of a shock absorber device between the truck frame and the body.

In Figures 1-4, the shock absorber device 15 is of the rotor type which includes a body portion 16, secured to a bracket 17 on the end transom 18 of the truck frame, and a relatively rotatable portion 19 having a crank 20. An elongated link 21 is pivotally connected at its ends to the outer end of crank 20 and to a bracket 22 on the vehicle body center sill. The parts just described are shown in solid lines in the position normally assumed when the vehicle is travelling over straight track. The broken lines indicate an extreme position assumed by link 21 relative to these other parts when the vehicle is travelling on curved track and the parts of the truck frame and vehicle body connected by the shock absorbing device have moved laterally of each other because of the swivelling of the truck and body about the center plate and because of the further lateral movement of the bolster (and the vehicle body) due to the action of the swing hangers. Preferably the shock absorber device will be any well known type having a valve arrangement or other means providing for limited movement of crank 20 and part 19 in either direction from the position shown to accommodate relative vertical movement of bolster and truck frame due to the action of the bolster springs without substantial resistance from the hydraulic fluid or friction elements of the shock absorber device, as is customary in the normal operation of the vehicle. This detail of the device is well known in the art and in itself does not constitute the present invention.

When the truck swivels horizontally or swings laterally relative to the vehicle body, the link swings angularly away from vertical position in the same direction as the adjacent portion of the truck, and this changes the angular relation between the link and the crank 20. If, in addition to the swivelling and lateral movement, there is vertical movement of the truck frame relative to the vehicle body, the angular relation of the crank and link is again changed.

The preferred position of the crank, before any relative swivelling, lateral or vertical movement of the truck frame and vehicle occurs, is at an angle downwardly from horizontal position, about as shown in the drawings. While the device will work with other initial angular positions of the arm, the angles between the crank and link existing during the maximum amount of lateral and vertical movements of the truck and body would not be too large or too small for effective operation of the device.

With the above explanation it will be obvious that abnormal vertical and transverse movements of the truck and vehicle body relative to each other will be checked, particularly when they are quick or jerky and that synchronization or cumulative effect of forces tending to produce such movements will be prevented, thus making for better riding qualities and reducing the stresses applied to the vehicle parts.

Figure 4:
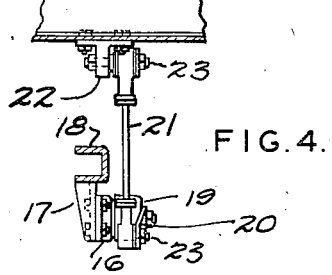
Figure 4 is a vertical longitudinal section taken on the line 4—4 of Figure 3.
Figure 4A:
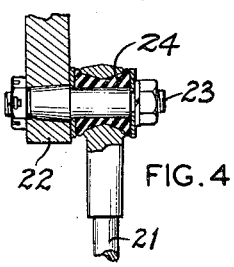
Figure 4a is a section through one of the pivotal connections at the ends of the link connecting the dampening device to the relatively movable vehicle part.

Preferably, the means pivotally connecting each end of link 21 to the associated part comprises a stud 23 firmly seated in one of the connected elements and provided with a rubber bushing or sleeve 24 (Figure 4a) which is encircled by the end of the link, thus providing for such inclination of the link in a plane extending longitudinally of the vehicle and as may be required to accommodate different relative angular positions of the link and stud. In other words, a substantial universal joint connection is provided for the ends of the link.

Figures 5 and 6 illustrate another form of the invention in which the shock absorber device 25 is of the cylindrical type, one end being pivotally connected to a bracket 27 on the vehicle body center sill 28 and the other end being pivotally connected to a bracket 29 integral with the center cross transom 30 of the truck frame, the side portions 31 of which form pedestals 32 for the axle journal boxes (not shown). The pivotal connection for each end of the shock absorber device to the associated vehicle part comprises a bolt 33 provided with rubber bushings or sleeves 34 which are encircled by the interconnected elements to produce the universal joint effect previously described.

Figures 7 and 8 illustrate another form of the invention in which the shock absorber device corresponds to that shown in Figures 5 and 6, but the latter is disposed horizontally with one end 35 pivotally connected to a bracket 36 on the truck frame end transom 37 and the other end 38 connected to the vehicle body end sill 39 by a linkage comprising a bell crank 40, fulcrumed on a bracket 41 on transom 37 and having one arm pivotally connected to a cylinder 38 and its other arm pivotally connected by a link 42 to a bracket 43 on the body center sill. The connections between link 42 and bracket 43 and bell crank 40 include bolts 44 with rubber sleeves or bushings 45 similar in construction and purpose to the corresponding details previously described.

Figures 9, 10 and 11 illustrate another form of the invention in which a pair of shock absorbers 51 and 52 are applied to the car underframe 53 and truck transom 54 at points spaced a substantial distance transversely of the longitudinal center line X of the car. Preferably the shock absorbers will be so mounted that their arms 55 and 56 are disposed tangentially to an arc having the truck and body center plate structure as a center or in plan view at right angles to radial lines Y and Z extending from the center plate structure through the shock absorber shafts. Brackets 57 and 58 for the connecting links 59 and 60 are also disposed so that the links swing in planes inclined to the longitudinal center line X. Hence, as the truck swings laterally relative to the car body, there will be a minimum inclination of links 59 and 60 from the vertical planes in which arms 55 and 56 move. The pivotal connections of the ends of links 59 and 60 to the associated brackets and shock absorbers include studs 61 provided with rubber bushings or sleeves, as detailed in Figure 4a.

This arrangement of the pair of shock absorbers and connecting links provides for the clearance of draft gear or a generator or generator drive structure, indicated at G, positioned beneath the central portion of the car underframe.

Figure 11 indicates in full line the normal position of one of the shock absorbing devices and the link by which it is connected to the car underframe and indicates in broken lines the positions assumed by the crank arm at extremes of its movements from its normal position. For example, the lines 51a indicate the position of the crank arm upon the extreme movement of the truck frame to the left from the normal position shown in Figure 10 accompanied by an extreme movement away from the car underframe, and broken lines 51b indicate the position assumed by the crank arm when the truck frame has reached its extreme movement to the right from the normal position shown in Figure 10 and its extreme movement towards the car body.

It will be understood that other types of shock absorber devices may be substituted for those illustrated and described and that any of the devices may be mounted at either end of the truck frame or at some other point as may be best adapted for the intended purpose and to meet conditions arising from various locations of equipment applied to the truck or to the body.

The invention is particularly applicable to trucks as illustrated, in which the frame supporting springs are widely spaced longitudinally of the truck and are not equalized, such as are present in light-weight vehicles used in high speed service, but the invention may be embodied in equalized trucks in which the frame-supporting springs are carried on equalizers extending between spaced axles instead of being mounted directly on or over the journal boxes. The exclusive use of the novel features illustrated and described and coming within the scope of the claims is contemplated.

What is claimed is:

1. In a railway vehicle, a vehicle body member, and a truck including a bolster supporting said body member, a truck frame member extending longitudinally of the truck, spring structure supporting the bolster on said truck frame, spaced wheeled axles, and springs nearer the ends of the truck than said bolster spring structure and supporting said frame member from said axles, and a shock absorber device having connections to said body member and truck frame member at points nearer to the springs supporting the truck frame member than to the bolster-supporting spring structure, said device accommodating normal vertical movement of said bolster on its spring support and dampening excessive relative movement of the end portions of the truck frame member due to uneven action of its supporting springs to prevent galloping action of the truck frame member relative to the body member.

2. A structure as described in claim 1 in which the truck frame member extends longitudinally of the vehicle beyond the wheels on the axles and is there connected to the vehicle body member by the shock absorber device.

3. A structure as described in claim 1 in which the spring dampening device includes a crank rotatably mounted on one of the members, there being a link connection between the outer end of said crank and the other of said members to accommodate lateral movement and swivelling movement of said members relative to each other.

4. A structure as described in claim 1 in which the spring dampening device connection to one member comprises a vertically disposed link of substantial length pivotally connected at its ends to said member and device respectively and freely accommodating lateral and swivelling movements of said members relative to each other.

5. A structure as described in claim 1 in which the spring dampening device comprises a cylindrical type shock absorber pivotally connected at its ends to respective members to accommodate the lateral and swivelling movements of said members relative to each other.

6. A structure as described in claim 1 in which the spring dampening device comprises a cylindrical type shock absorber pivotally connected at one end to one of said members, and linkage pivoted on that member and connected to the other end of the shock absorber and to the other member to accommodate the lateral and swivelling movements of said members relative to each other.

7. In a railway vehicle, a truck including spaced wheeled axles and a frame member carried thereby, a body member spring-supported on the truck frame member, there being a swivelling connection between the body member and the truck, spring dampening devices arranged at opposite sides of the vehicle and spaced from said swivelling connection longitudinally of the vehicle beyond one of said axles and each spring dampening device includes a crank rotatably mounted on one of the members to swing in a substantially vertical plane disposed substantially at right angles to a line extending from the crank axis to the swivelling connection, there being links pivotally connecting the swinging ends of the cranks to the other member to freely accommodate swivelling of the body and truck members relative to each other.

8. Structure as described in claim 1 in which the connection between at least one of the members and the spring dampening device provides for universal swivelling of the connected parts to accommodate different angular relations between the members.

9. Structure as described in claim 7 in which the connections between at least one of the members and the spring dampening devices provides for universal swivelling of the connected parts to accommodate different angular relations between the members.

JAMES C. TRAVILLA, Jr.